United States Patent
Fujinaga (10) Patent No.: US 7,561,296 B2
(45) Date of Patent: Jul. 14, 2009

(54) IMAGE PROCESSING APPARATUS

(75) Inventor: Seiya Fujinaga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 905 days.

(21) Appl. No.: 10/943,886

(22) Filed: Sep. 20, 2004

(65) Prior Publication Data
US 2005/0063012 A1 Mar. 24, 2005

(30) Foreign Application Priority Data
Sep. 24, 2003 (JP) ............................ 2003-330948

(51) Int. Cl.
*G06K 15/00* (2006.01)
*G06F 3/12* (2006.01)
(52) U.S. Cl. ..................... 358/1.18; 358/1.16; 358/1.15
(58) Field of Classification Search .................. 358/1.1, 358/1.13, 1.15, 1.16, 1.18, 1.17, 474, 487, 358/1.2, 1.9, 1.6, 1.14, 407, 468, 404, 444, 358/1.4, 1.5, 1.11; 382/312, 321, 317; 715/200, 715/274, 224, 221, 222, 223, 225, 226; 347/2, 347/3, 5, 14, 23; 399/1, 6, 8
See application file for complete search history.

(56) References Cited

U.S. PATENT DOCUMENTS

| 5,666,214 A | 9/1997 | MacKinlay et al. ......... 358/453 |
|---|---|---|
| 5,680,223 A | 10/1997 | Cooper et al. ............... 358/403 |
| 6,535,298 B2 | 3/2003 | Winter et al. ............... 358/1.16 |
| 6,563,598 B1 | 5/2003 | Johnson et al. ............ 358/1.15 |
| 6,744,529 B2 | 6/2004 | Winter et al. ............... 358/1.15 |
| 2001/0019416 A1 | 9/2001 | Monty et al. ............... 358/1.19 |
| 2001/0040685 A1 | 11/2001 | Winter et al. ................ 358/1.6 |
| 2002/0051201 A1* | 5/2002 | Winter et al. ............... 358/1.16 |
| 2004/0190059 A1 | 9/2004 | Winter et al. ............... 358/1.15 |

FOREIGN PATENT DOCUMENTS

| JP | 2002-273973 | 9/2002 |
| JP | 2002-305701 | 10/2002 |

* cited by examiner

*Primary Examiner*—Dov Popovici
(74) *Attorney, Agent, or Firm*—Fitzpatrick, Cella, Harper & Scinto (57) ABSTRACT

It is an object to provide an image processing apparatus capable of re-printing a desired sheet without any complicated operation in the case of desiring to get one more index sheet because of miswriting, etc. on the index sheet, and enabling a user to easily obtain the sheet. An image processing apparatus constructed such that a sheet code embedded with information about images described on a predetermined mark sheet is created, the mark sheet is created by use of the images stored in the image storing unit and the created code, the created marks sheet is outputted, a mark on the mark sheet is read, it is judged whether the mark on the mark sheet has been read or not, and, when judging that the predetermined mark on the mark sheet has been read, the same mark sheet as the created mark sheet is re-outputted.

4 Claims, 8 Drawing Sheets

IMAGE PROCESSING APPARATUS

BACKGROUND OF THE INVENTION

1. Field of the Invention

The present invention relates to an image processing apparatus.

2. Related Background Art

As digital cameras have spread rapidly in recent years, sales proceeds of the digital cameras have risen, wherein purchasers of the digital cameras, which has been given an image as a peripheral device of a personal computer, extend to households having none of the personal computers. For this reason, especially in recent years, there has increased a demand that data on the digital camera be directly printed by a consumer (or household) printer, etc. without through the personal computer.

The data of an image captured by the digital camera are stored on a memory card such as a SD (Super Density) card, a Compact Flash (registered trademark) memory, etc. If the household has the personal computer, the data of the captured image can be taken in the personal computer and can be also printed by a recording apparatus such as a printer and so on.

On the other hand, what is adopted as a direct printing method without through the personal computer is a method in which a medium such as the memory card, etc. stored with the digital image is directly inserted into the recording apparatus, and a photo is printed by operating an operation unit of the recording apparatus.

As for many consumer-oriented recording apparatuses, however, their operation units are small in size and a less number of keys are prepared. Further, those recording apparatuses require a dedicated viewer, etc. when selecting an image and are more difficult in their operations than those of the personal computer.

Particularly when printing the image on the memory card, there are required many settings, i.e. browsing the image, designating an image number, designating the number of sheets for printing the image, designating a print resolution, and so on. On the other hand, the recording apparatus cannot prepare many keys and tends to be complicated in operation.

Such being the case, as the method of printing the image data on the memory card, there is adopted such a method that in a complex apparatus including a reading unit and a recording unit of an index sheet for navigation of printing the photo (or image) is used in view of functions of the two units.

According to the aforementioned conventional methods, an index sheet on which at first, print target (candidate) images are collected for an index, a marking area is given to each image, then marking areas capable of indicating a print resolution, etc. are added, is recorded in the image processing apparatus.

A user marks want-to-record images and record setting on the index sheet described above. This method is similar to an extra photo printing procedure and is therefore an operation method intuitively understandable to the user. Thereafter, the index sheet filled by the user is read by the reading unit of the complex apparatus, and the complex-apparatus prints the photo on the basis of a result of the user's marking. On the occasion of printing the photo without through the personal computer, the complicated operation of printing the photo that is conducted on an operation panel can be easily executed by employing this method (refer to, e.g., Patent Document 1 and Patent Document 2). In these Patent Documents 1 and 2, the aforementioned index sheet is called a proof sheet.

(Patent Document 1) Japanese Patent Laid-Open Application No. 2002-273973

(Patent Document 2) Japanese Patent Laid-Open Application No. 2002-305701

By the way, according to the conventional methods described above, there is no problem if the user could effect marking properly on the index sheet. In case the user mistakenly puts the mark, however, the mark should be erased by an eraser. In this case, frequently, the index sheet is smudged, and/or an erased mark is left. If the smudge and the erased mark are left, there is a possibility that they cause mis-recognition when the index sheet is read.

As a result, there is required an operation of re-outputting the mistaken sheet. In the conventional examples, however, it is required to execute the same operation again, so that the user has to execute the output operation twice. Consequently, this imposes a burden on the user.

The conventional examples do not show, if there are a large number images and a plurality of index sheets, there is not prepared any method of printing the mistaken sheet even when it is desired to get only the mistaken sheet. Hence, there arises a problem that it is required to re-output the plurality of index sheets.

Namely, in the conventional examples given above, the problem is that the user must re-print all the sheets including the properly-written sheet, which imposes a burden of consuming extra sheets of paper upon the user.

It is an object of the present invention to provide an image processing apparatus capable of re-printing a desired sheet without any complicated operation and of enabling a user to easily obtain the sheet, in a case where it is desired to get one more index sheet because of miswriting, etc. on the index sheet.

SUMMARY OF THE INVENTION

An image processing apparatus is constructed such that a sheet code embedded with information about images described on a predetermined mark sheet is created, the mark sheet is created by use of the images stored in the image storing means and the created code, the created marks sheet is outputted, a mark on the mark sheet is read, it is judged whether the mark on the mark sheet has been read or not, and, when judging that the predetermined mark on the mark sheet has been read, the same mark sheet as the created mark sheet is re-outputted.

The present invention exhibits an effect that in a case where it is desired to get one more index sheet because of miswriting, etc. on the index sheet, a desired sheet can be re-printed simply by filling marks provided in predetermined positions on the sheet and reading this sheet without any complicated operation, whereby the user can easily obtain the sheet.

DESCRIPTION OF THE PREFERRED EMBODIMENTS

Figure 1:
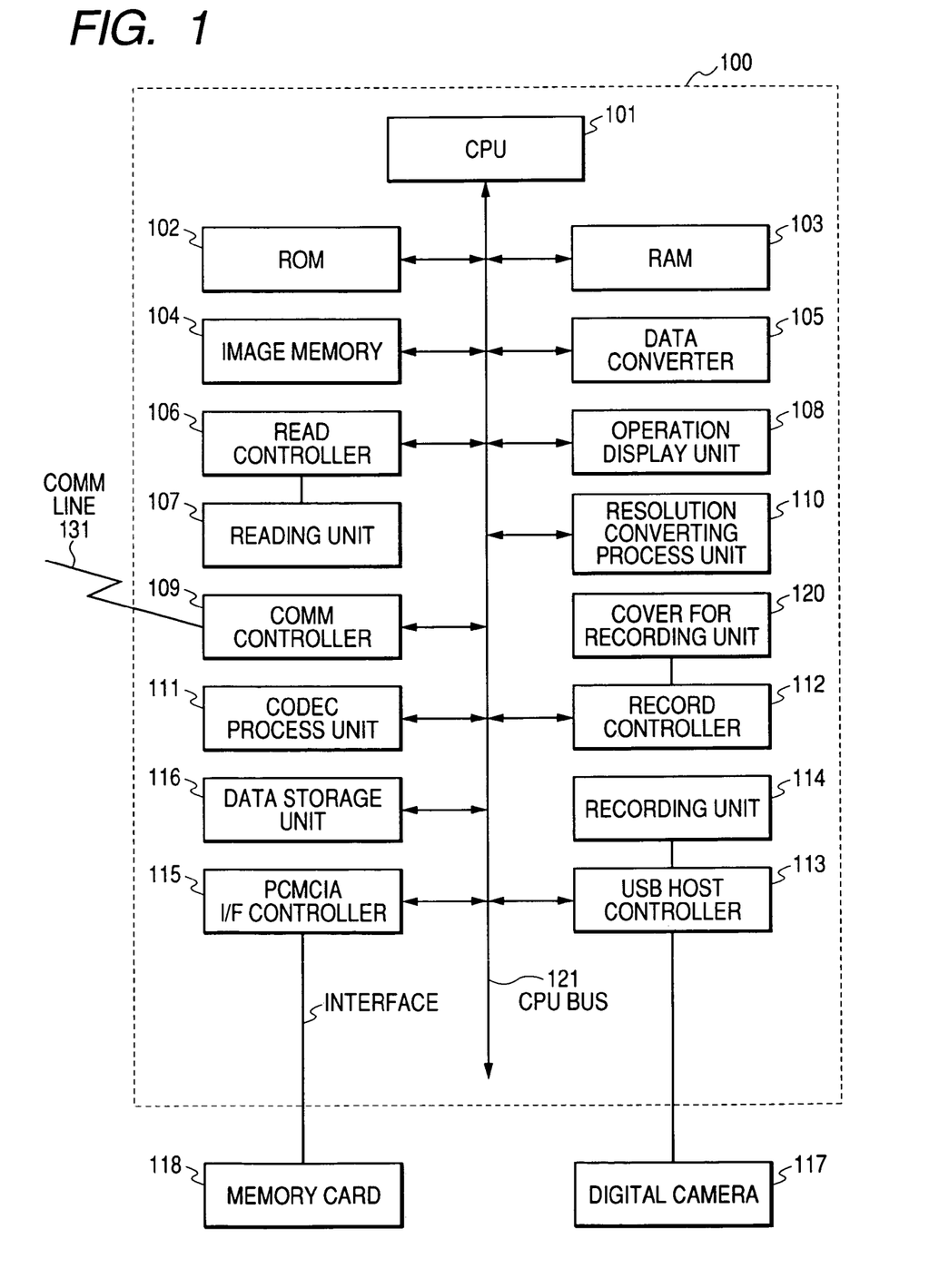
FIG. 1 is a block diagram showing an outline of a construction of an image processing apparatus 100 configuring an image processing system by way of a first embodiment of the present invention.

FIG. 1 is a block diagram showing an outline of a construction of an image processing apparatus 100 configuring an image processing system by way of a first embodiment of the present invention.

The image processing apparatus 100 includes a CPU 101, a ROM 102, a RAM 103, an image memory 104, a data converter 105, a read controller 106, a reading unit 107, an operation display unit 108, a communication controller 109, a resolution converting process unit 110, a CODEC process unit 111, a record controller 112, a USB host controller 113, a recording unit 114, a PCMCIA I/F (Personal Computer Memory Card International Association Interface) controller 115, a data storage unit 116, a recording unit cover 120 and a CPU bus 121.

Further, a digital camera 117 is connected to the USB host controller 113, and a memory card 118 is connected to the PCMCIA I/F controller 115.

The CPU 101 is a system control unit and controls the whole of the image processing apparatus 100.

The ROM 102 is stored with control programs executed by the CPU 101 and with a pre-installed operating system (OS) program, etc. According to a embodiment, the respective control programs stored on the ROM 102 softwarewise control scheduling, task switching, etc. under the control of the pre-installed OS stored on the ROM 102.

The RAM 103 is constructed of a SRAM (static RAM), etc. The RAM 103 is stored with program control parameters, etc., set values registered by an operator and management data, etc. of the image processing apparatus 100. The RAM 103 is provided with buffer areas for a variety of works.

The image memory 104 is structured of a DRAM (dynamic RAM), etc. and is stored with image data.

The data converter 105 analyzes a page description language (PDL), etc. and performs an image data conversion such as a CG (computer graphics) development of character data and so on.

The read controller 106 effects, through an unillustrated image process controller, a variety of image processes such as a binarizing process, a half-tone process, etc. upon electrical image data into which the reading unit 107 optically has read an original with a CIS (Contact Image Sensor) image sensor and converted image signals, and outputs hyperfine image data. Note that in the embodiment the read controller 106 corresponds to both of a sheet read control system for reading the original while conveying the original and a book read control system for scanning the original placed on a board for the original.

The operation display unit 108 is constructed of (1) an operation unit which includes numerical value input keys, character input keys, one-touch phone number keys, mode setting keys, a decision key, a cancel key, etc. and which is used for a user to decide image transmitting destination data and to register setting data of registered values and register setting of an energy saving mode, and (2) a display unit which includes a variety of keys, an LED (Light Emitting Diode), an LCD (Liquid Crystal Display) and so on and which displays a variety of input operations by the operator, an operating state and status information of the image processing apparatus 100, and so forth.

The communication controller 109 is constructed of a MODEM (modulator/demodulator), a NCU (Network Control Unit) and so on. In the embodiment discussed above, the communication controller 109 is connected to an analog communication line (PSTN (Public Switched Telephone Network)) 131, and performs T30 Protocol-based communication control and line control such as originating and receiving a call via the communication line.

The resolution converting process unit 110 executes resolution converting control of a milli-inch resolution conversion of the image data, and so forth. Note that the resolution converting process unit 110 is also capable of executing an enlarging/reducing process of the image data.

The CODEC process unit 111 executes a coding/decoding process and the enlarging/reducing process of the image data (MH (Message Handler), MR (Modified READ code), MMR (Modified Modified READ code), JBIG (Joint Bi-level Image experts Group), JPEG (Joint Photographic Experts Group), etc.) handled in the image processing apparatus 100.

The record controller 112 executes a variety of image processes such as a smoothing process, a record density correcting process, a color correcting process, etc. upon the image data for printing through the unillustrated image process controller, thereby converting the printing image data into the hyperfine image data. The record controller 112 outputs the thus-converted hyperfine image data to the USB host controller 113 (which will be described later on) adapted to periodically acquire status information data on the recording unit 114.

The USB host controller 113 is a controller for performing communications based on the protocol defined by USB communication standards. The USB communication standards are standards that enable bidirectional data communications to be performed at a high speed, wherein a plurality of hubs or functions (slaves) can be connected to one single host (master). The USB host controller 113 has a function as the host in the USB communications.

The recording-unit 114 is a printing apparatus constructed of a laser beam printer, an inkjet printer or so on. The recording unit 114 prints color image data or monochrome image data on a print member. The recording unit 114 performs the communications based on the protocol defined by the USB communication standards with the USB host controller 113. Especially, the recording unit 114 functions as the "function" (slave).

The PCMCIA I/F controller 115 carries out the communication control of the USB interface and executes the protocol control based on the USB communication standards. The PCMCIA I/F controller 115 packetizes data given from a USB control task executed by the CPU 101, and transmits the USB packet to an external information processing terminal. Conversely, the PCMCIA I/F controller 115 converts the USB packet given from the external information processing terminal into data, and transmits the data to the CPU 101.

The data storage unit 116 is a unit for storing the data. The DRAM in the image memory 104 is not provided with any data backup area, and hence, according to the embodiment, a data storage area is prepared as a unit for data storage. The data storage area might be shared with the image memory 104 in some cases. The data storage unit 116 is capable of backing up the data, and so on. The embodiment uses the DRAM, but a hard disc, a volatile memory, or the like may be employed.

The digital camera 117 is a camera in which an image captured through lenses is stored as digital data. The digital camera 117 is connected to the USB host controller 113 and performs the communications with this controller 113, whereby the data can be received and transferred between the digital camera 117 and the image processing apparatus 100

The memory card 118 is a data storage medium and can be connected to the image processing apparatus 100. According to the embodiment, the memory card 118 is connected via the PCMCIA interface to the image processing apparatus 100, but may be connected otherwise. The image data and other electronic data can access (link to) the data in the memory card via the PCMCIA I/F controller 115.

In the embodiment, the USB communications of the record function utilize a one-to-one connection mode (topology).

The components 101 to 106 and the components 108 to 113 described above are connected to each other via the CPU bus controlled by the CPU 101.

Figure 2:
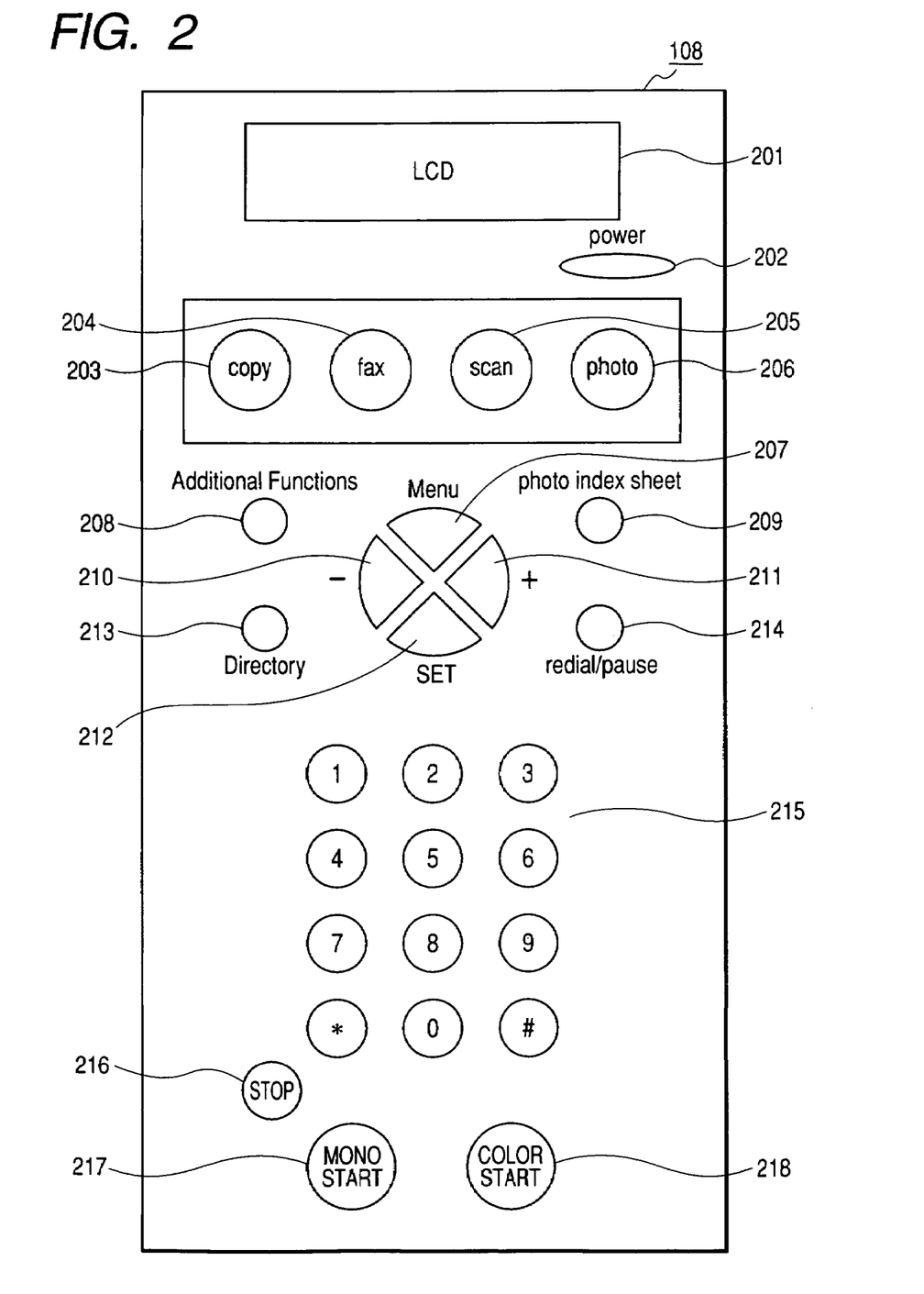
FIG. 2 is a view showing a specific example of an operation display unit 108 provided in the image processing apparatus 100.

FIG. 2 is a view showing a specific example of the operation display unit 108 provided in the image processing apparatus 100.

The operation display unit 108 includes an LCD 201, a power key 202, a copy mode key 203, a fax mode key 204, a scan mode key 205, a photo mode key 206, a menu key 207, a user setting key 208, a photo index sheet key 209, a minus key 210, a plus key 211, a set key 212, a telephone directory key 213, a redial key 214, a ten key 215, a STOP key 216, a monochrome start key 217 and a color start key 218.

The LCD display 201 is a display for displaying a message, an operation prompt and various types of information. The power key 202 is a key for turning ON/OFF a power source of the image processing apparatus 100.

The copy mode key 203 is a key for setting the image processing apparatus 100 in a copy enable state (copy mode). When pressing the copy mode key 203, the image processing apparatus can be set in the copy mode.

The fax mode key 204 is a key for setting the image processing apparatus 100 in a fax enable state (fax mode). When pressing the fax mode key 204, the image processing apparatus can be set in the fax mode.

The scan mode key 205 is a key for setting the image processing apparatus 100 in a scan enable state (scan mode). When pressing the scan mode key 205, the image processing apparatus can be set in the scan mode.

The photo mode key 206 is a key for setting the image processing apparatus 100 in a direct printable state (photo mode) from a digital photo card and from the camera. When pressing the photo mode key 206, the image processing apparatus can be set in the photo mode.

The menu key 207 is a key for displaying items in which set values are set when executing copying, faxing and the direct print from the card, etc. When pressing the menu key 207, the set items for the execution can be displayed on the LCD 201, then selected by use of the plus key 211, the minus key 210, etc. and set by the set key 212.

The user setting key 208 is a key for displaying a screen for the user to register the set values to be set in the image processing apparatus 100. When pressing the user setting key 208, the user set items can be displayed on the LCD 201, then selected by use of the plus key 211, the minus key 210, etc. and set by the set key 212.

The photo index sheet key 209 is a key for moving to a screen for printing on a photo index sheet and for reading the photo index sheet. In a state where the memory card 118 is inserted into the image processing apparatus 100, when pressing the photo index sheet key 209, there is moved to the screen for printing on a photo index sheet 300 and for reading the photo index sheet 300. The reading or printing is selected by using the plus key 211 or the minus key 210, etc. and can be set by the set key 212. Note that the photo index sheet will be explained in detail with reference to FIG. 3.

The minus key 210 and the plus key 211 are keys used for the user to make a choice from a plurality of options in the menu, the user registration or so forth. The minus key and the plus key are organized in a reversal sequence and in a forward sequence, respectively.

The set key 212 is a key for deciding the selected item. The telephone directory key 213 is a key for calling a telephone number registered in the telephone directory. The redial key 214 is a key for redialing, when pressed, a station called by dialing last time.

The ten key 215 is a key group used when registering the telephone number, the fax number, a name of the destination party, etc., setting the number of copies or dialing. The STOP key 216 is a key for stopping the transmission and receipt by fax, copying and other operations.

The monochrome start key 217 is a key for starting a monochrome fax transmission, a monochrome copy or so on. The color start key 218 is a key for starting a color fax transmission, a color copy, a color photo print or so on.

Figure 3:
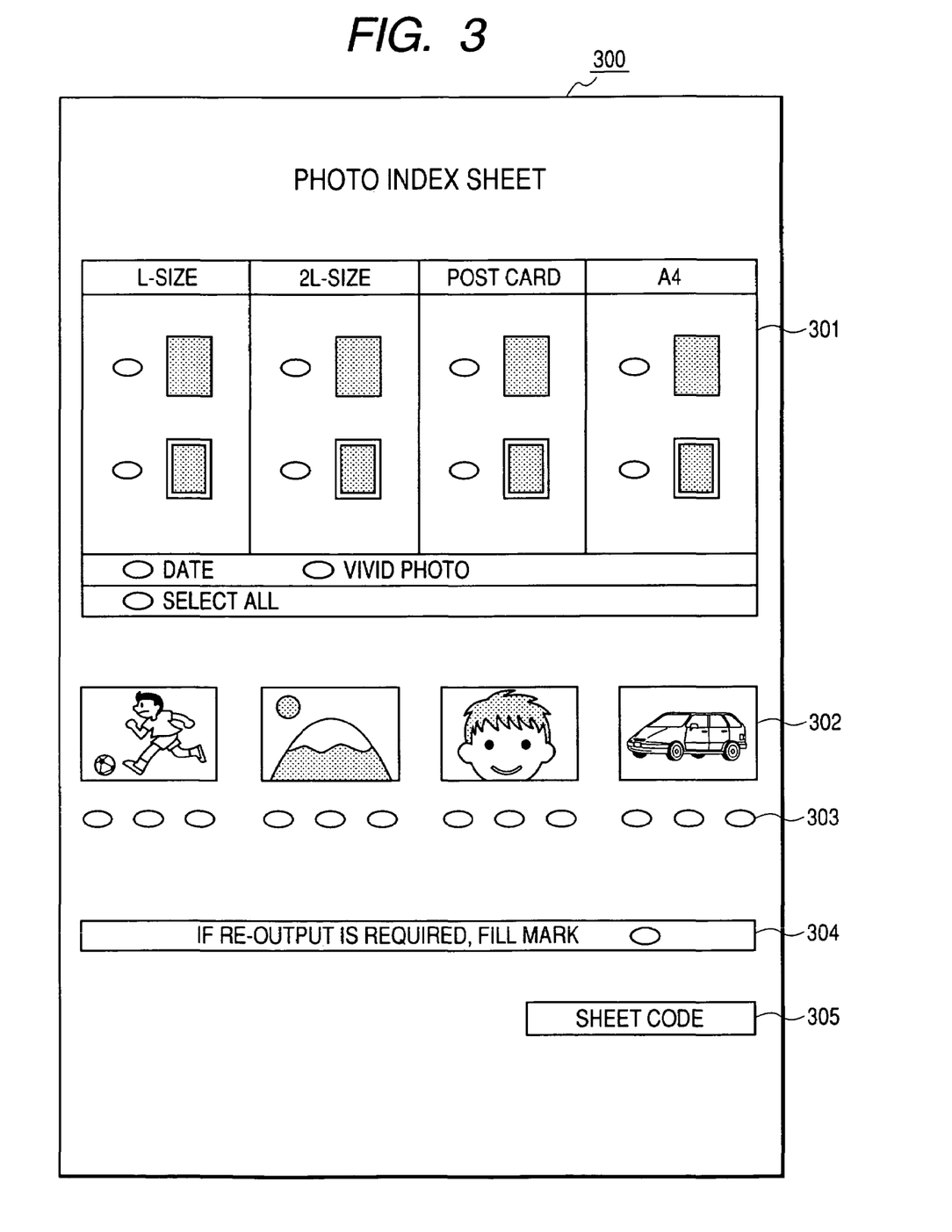
FIG. 3 is a view showing one example of a photo index sheet 300 used in the embodiment.

FIG. 3 is a view showing one example of the photo index sheet 300 utilized in the embodiment.

The photo index sheet 300 is a sheet for specifying a print object to be printed by the image processing apparatus 100, by pressing the photo index sheet key 209 and thus giving a print instruction.

When the photo index sheet print instruction is given via the operation display unit 108, the image data are read out from the memory card 118 attached to the image processing apparatus 100, and the photo index sheet 300 is created.

On this occasion, marks are put for the respective images selectable as the print objects on the photo index sheet 300. The user enters indications for photo-printing the image within the memory card, onto the photo index sheet 300, and the data are read into the image processing apparatus 100, thereby actualizing the photo print.

Note that when entering the indications for photo-printing the image within the memory card 118 onto the photo index sheet 300, the print setting is done by filling (or marking out) the mark put for the want-to-print image. The print setting is attained simply by filling the mark corresponding to the want-to-print image. The photo index sheet 300 subjected to marking for the want-to-photo-print image is placed on the reading unit 107. The photo index sheet 300 is read by pressing the photo index sheet key 209. A mark status is judged when reading the photo index sheet 300, and the image to be photo-printed is recognized, thus conducting the photo print.

It is to be noted that the photo index sheet 300 is one example of a mark sheet, and other mark sheets may be used as substitutes for the photo index sheet 300.

The photo index sheet 300 includes a mark sheet area 301, an image selection thumbnail (area) 302, and an image selection thumbnail mark (area) 303, a re-output mark 304 and a sheet code 305.

The mark sheet area 301 is an area in which the print setting is determined when doing the photo print. The mark sheet area 301 contains items such as a paper size, a paper type, a resolution, date printing, a VIVID photo, selection of all images and so on. When setting the respective items, the item to be set is filled with a mark, and the mark-filled item is set. Further, a (select all) mark is provided. This (select all) mark is a mark to be filled when selecting all the images displayed on the sheet.

The image selection thumbnail 302 and the image selection thumbnail mark 303 are a thumbnail and a mark by which a desired image (an image desired to be photo-printed) among the images displayed on the photo index sheet 300 is selected. The image selection thumbnail 302 is a thumbnail (display area) of a selection object image. The image selection thumbnail mark 303 is a mark provided corresponding to (a thumbnail of) the desired image (the image desired to be photo-printed) among the displayed images.

In the image selection thumbnail 302 and the image selection thumbnail mark 303, the mark is attached to every thumbnail image, and the mark 303 corresponding to the image desired to be photo-printed gets filled, which indicates that the image corresponding to this filled-mark has been selected. Further, the mark 303 contains a content showing the number of prints, wherein the user can determine (select) how many photos of each image are printed.

To be specific, three pieces of marks 303 are provided under one thumbnail image 302, when filling the left-sided mark, the central mark and the right-sided mark of the three marks 303, this implies such setting that the photo of the image 303 corresponding thereto is printed by one sheet, two sheets and three sheets, respectively.

The re-output mark 304 is a mark for re-outputting the same but unfilled photo index sheet as the photo index sheet 300 by filling the mark 304 and then by the sheet reading operation of the image processing apparatus 100, if the user has miswritten the sheet, and so forth.

The sheet code 305 is a code containing the information of the sheet 300. While the reading unit 107 reads the photo index sheet 300, the information of the sheet 300 is read from this sheet code 305, thereby enabling the image processing apparatus 100 to recognize the information showing what image exists, and so on.

Note that the method described above is given by way of one example of the photo index sheet 300 as a photographic printing method. If correctly done with respect to the sheet re-output method, however, the sheet re-output may be performed by other methods.

Figure 4:
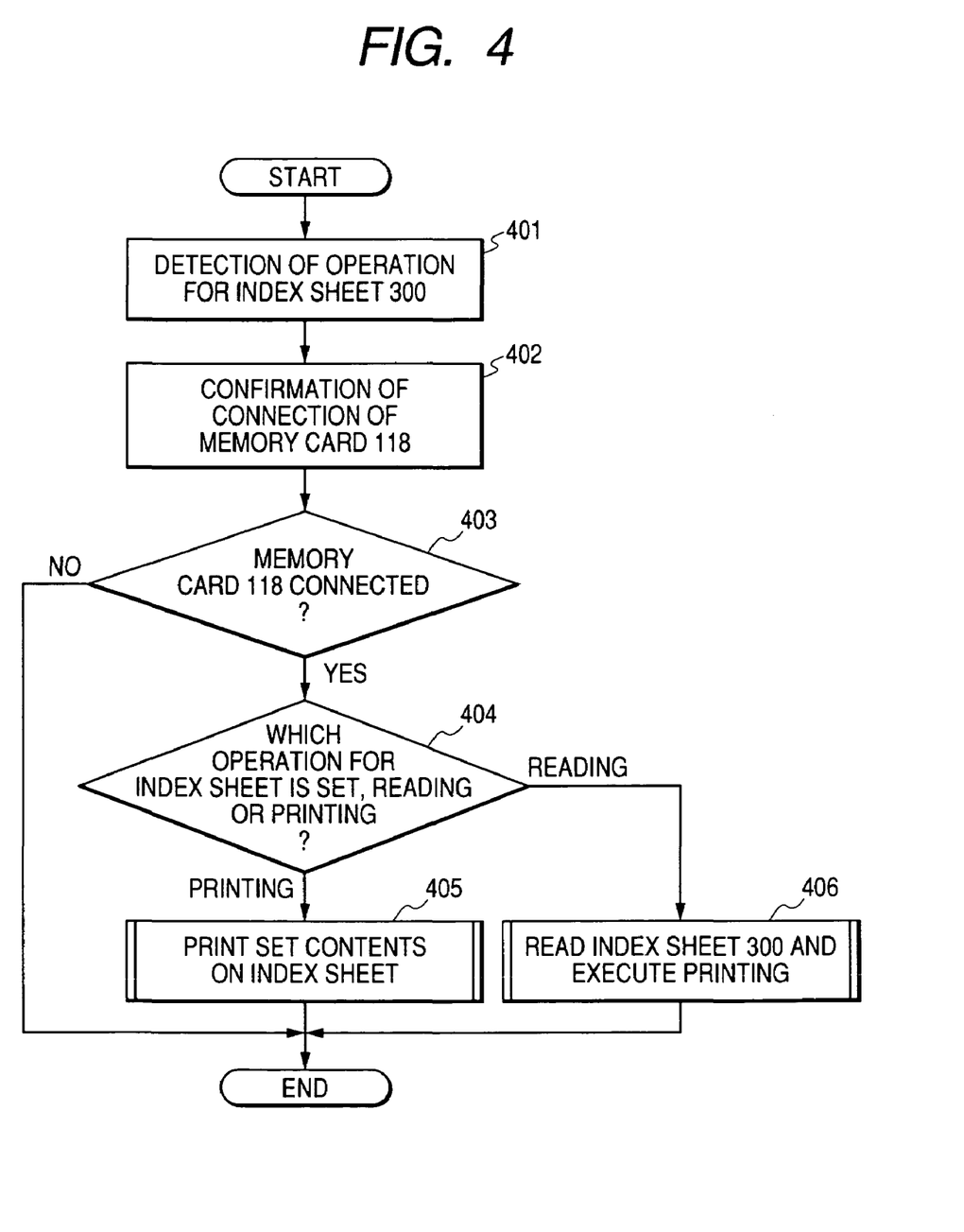
FIG. 4 is a flowchart showing an operation of indicating a photo print object, etc. by using the photo index sheet 300 in the embodiment.

FIG. 4 is a flowchart showing an operation of indicating the photo print object, etc. by use of the photo index sheet 300 in the embodiment.

The photo index sheet key 209 on the operation display unit 108 is pressed for printing the photo index sheet 300, whereby a series of operations related to the photo index sheet 300 can be executed.

To start with, after detecting in step 401 through the operation display unit 108 that the print operation of the photo index sheet 300 has been done, it is confirmed in step 402 that the memory card 118 is connected.

Also in the memory card confirmation step of step 403, if the memory card 118 is not connected, the printing can not be conducted, and operation is finished. Whereas if the memory card 118 is connected, the image that should be photo-printed is designated by use of the plus key 211, the minus key 210, the set key 212, etc. on the operation display unit 108 in step 404. If the images stored on the memory card 118 are sorted out in the sequence of the photographing date, the images are designated based on the numbers (NOs.) assigned to the images in the sorting sequence. For example, No. 10 is displayed by using the plus key 211/minus key 210 and is set by manipulating the set key 212. Further, No. 20 is displayed by using the plus key 211/minus key 210 and is set by manipulating the set key 212.

The images assigned NO. 10 to NO. 20 that are stored on the memory card 118 are completely designated. Herein, the image may also be designated by using the ten key 215 in place of employing the plus key 211/minus key 210. With an end of these operations, the photo print setting on the photo index sheet 300 is finished, and thereafter, in step 405, the setting contents of the photo print are printed on the photo index sheet 300. This printing will be dealt with in detail in the discussion in FIG. 5.

On the other hand, when the reading of the photo index sheet 300 is set in step 404, in step 406, the photo index sheet 300 is read, and the photo is printed according to the readout setting contents of the photo print. The reading and the printing of the photo index sheet 300 will be described in depth in FIG. 7.

The printing and the reading of the photo index sheet 300 are executed through the operation display unit 108 as described above, and may also be carried out by use of means other than the operation display unit 108.

Figure 5:
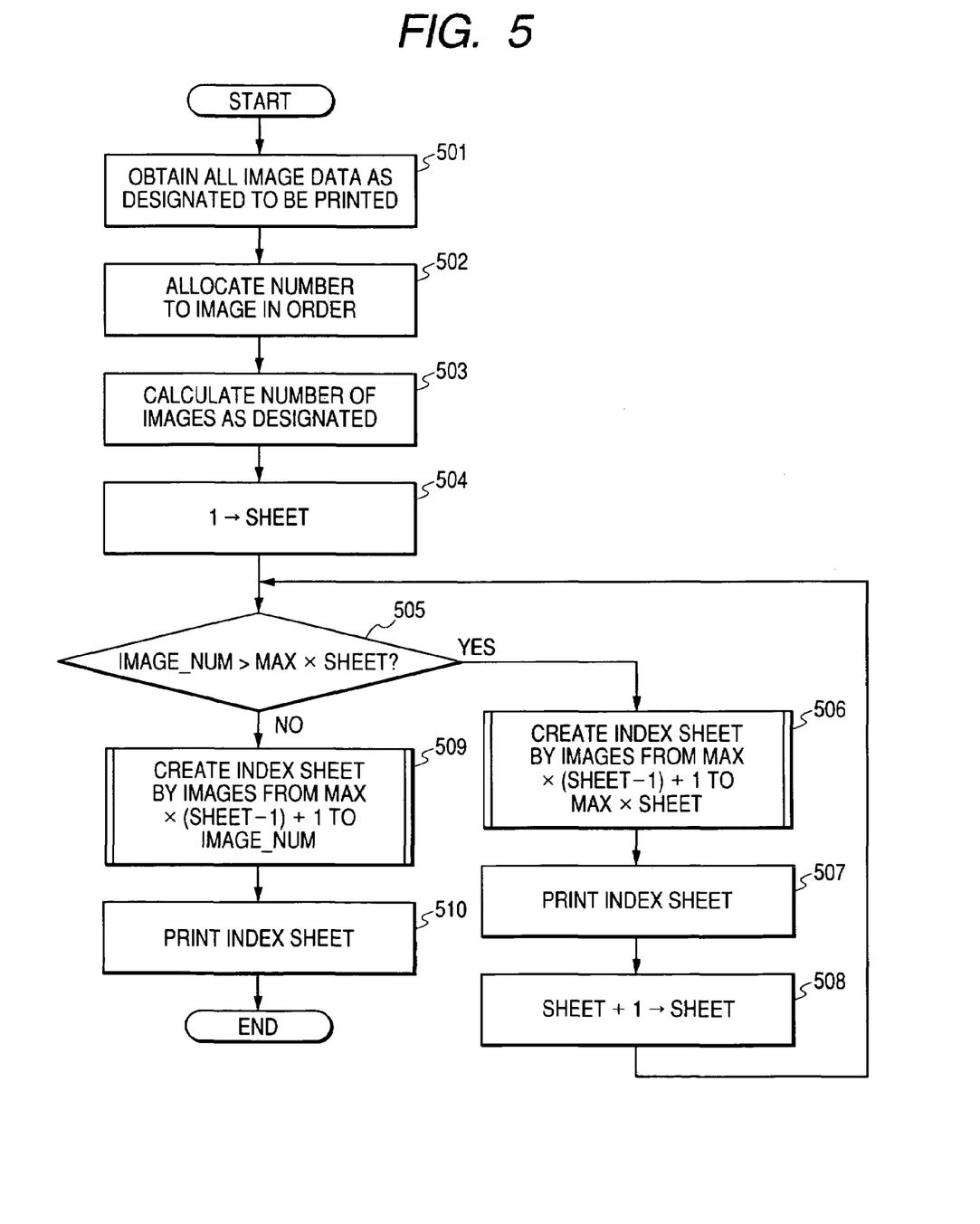
FIG. 5 is a flowchart showing an operation of printing the photo index sheet 300 in the embodiment.

FIG. 5 is a flowchart showing an operation of printing the photo index sheet 300 in the embodiment.

To begin with, in step 501, as for the photo index sheet 300, the information about the print object images designated by the user is acquired.

In the embodiment, the image data on the memory card 118 are the photo print object and therefore obtained from the memory card 118. In this case, for speeding up the printing of the sheet 300, the thumbnail images are acquired as the image data and displayed on the sheet 300. In step 502, the image numbers are assigned to the thumbnail images. The thus-assigned image numbers are numbers used internally by the image processing apparatus 100 when selecting the image.

The user has no concern about the assigned image numbers, and may absolutely simply fill the necessary items on the sheet 300. The reading unit 107 read the filled-items. In step 503, the number of images designated by the user is calculated. Herein, (IMAGE_NUM) represents the number of designated images. In the case of designating the number of images, though there are a variety of the number-of-images designating methods such as designating the number of sheets, designating a date, designating all the images, etc. In a case where the number of images is not designated, the user cannot grasp how many images exist as the designation object images, and hence there is a necessity of automatically changing the number of sheets in accordance with the number of images.

Therefore, the number of images is required to be determined. In step 504, a sheet page parameter (or variable) of the sheet to be printed is initialized. The sheet page parameter is expressed by (SHEET). The sheets 300 are counted from one, and therefore the initialization value is "1".

Next, in step 505, the number of images is compared with the sheet 300. Herein, (MAX) represents the maximum number of images entering the sheet 300. In this step 505, it is checked whether or not the images (all the images) designated by the user can be entered to the end in the page that is to be printed at the present.

At first, a value of SHEET is directly the page number of the sheet 300, and hence a product of SHEET and the maximum number MAX of the images entering the sheet 300 is the number of images entering up to the (SHEET)th page. It is judged from this whether IMAGE_NUM is larger or smaller. If IMAGE_NUM is larger than MAX×SHEET, the operation proceeds to step.506. Whereas if IMAGE_NUM is smaller (or not larger) than MAX×SHEET, the operation proceeds to step 509.

In step 506, the MAX number of images are printed on the (SHEET)th page. The photo index sheet 300 is created by the images ranging from the image of the image number MAX× (SHEET−1)+1 to the image of the image number MAX× SHEET. In the case of printing the (SHEET)th page, the images have already been printed up to the sheet 300 of which the page number is given by SHEET−1. The number of images thereof is given by MAX×(SHEET−1).

Accordingly, the print object images to be printed on the (SHEET)th page are the images ranging from the next image of MAX×(SHEET−1) to the image of (MAX×SHEET) which is, i.e., given such as the maximum number enterable in the sheet 300 plus (+) MAX. Therefore, the photo index sheet 300 is formed of the images ranging from the image of the image number MAX×(SHEET−1)+1 to the image of the image number MAX×SHEET.

The photo index sheet 300 is formed in step 506 and printed in step 507. After printing the sheet 300, the parameter SHEET is incremented by 1 in step 508, and the operation returns to step 505 in order to form the next sheet 300.

In step 505, if IMAGE_NUM is smaller (or not larger) than MAX×SHEET, in step 509, the images on the sheet 300 consist of the images ranging from the image of the image number MAX×(SHEET−1)+1 to the image of IMAGE_NUM. In step 509, the images on the sheet 300 of the last page are organized.

Figure 6:
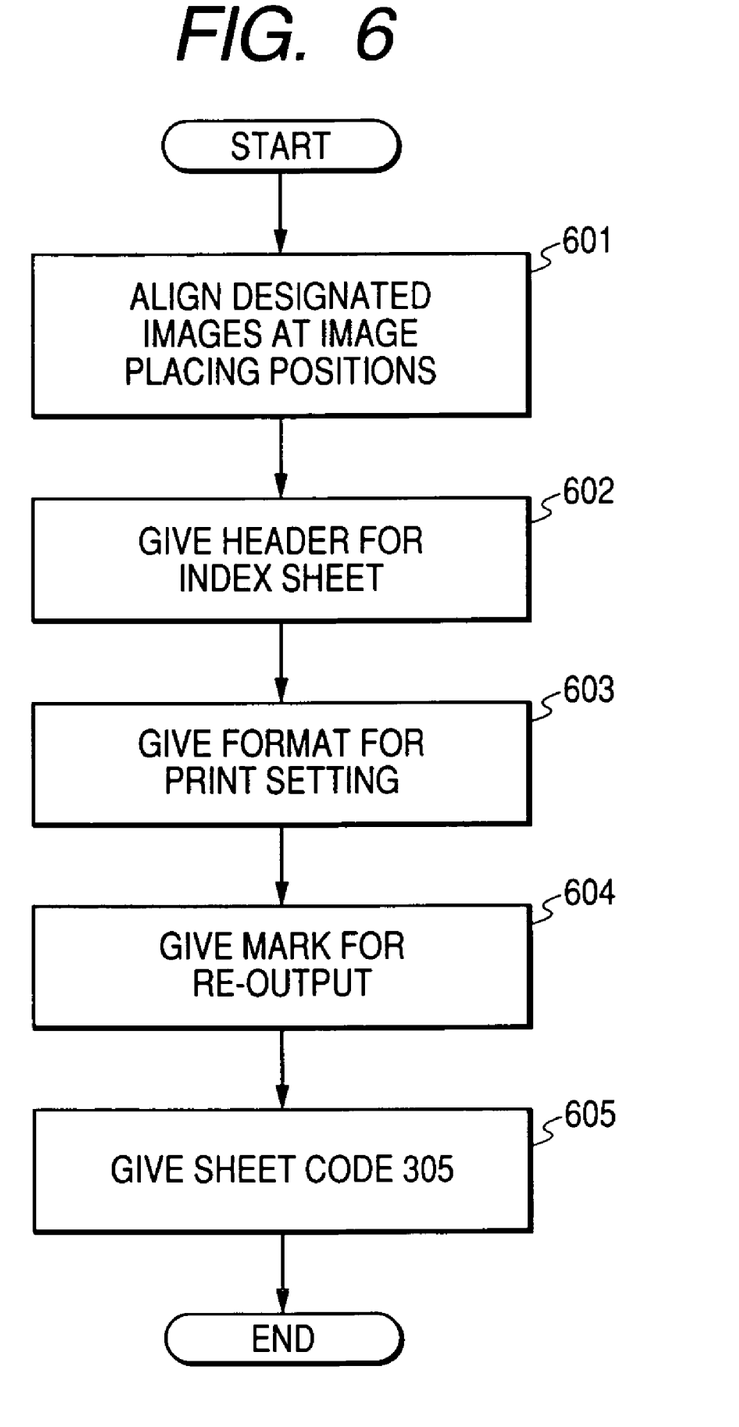
FIG. 6 is a flowchart showing an operation of organizing images on the photo index sheet 300 in the embodiment.

Therefore, the images have already been printed on the sheet 300 up to the (SHEET−1)th page. Since the number of images is given by MAX×(SHEET−1), the photo index sheet 300 is formed of the images ranging from the next image of MAX×(SHEET−1) to the image of the designated image number IMAGE_NUM. FIG. 6 shows a detailed description of the operation of forming the photo index sheet 300. In step 510, the photo index sheet 300 is printed.

As described above, the printing of the sheet 300 involves such an operation that the user selects the image. The image selection is simplified to the greatest possible degree, and nevertheless this operation might be time-consuming to the user. In particular, when trying to print as the user intends, this requires a complicated operation.

In the present embodiment, the plurality of sheets 30 are printed, and hence the printing is effected in a way that determines the pages of the sheets 300, wherein the maximum number of images enterable in the sheet 300 is used as the reference value. In the case of printing the plurality of sheets 300, however, other methods of printing the plurality of sheets 300 may also be adopted.

FIG. 6 is a flowchart showing the operation of organizing (forming) the images on the photo index sheet 300 in the embodiment described above.

In FIG. 5, when printing the photo index sheet 300, the designated images among the images stored on the memory card 118 are extracted, thereby organizing the images on the photo index sheet 300. The images organized herein are printed by the recording unit 114, thereby printing the photo index sheet 300.

To start with, in step 601, the images designated by the user as the object images on the photo index sheet 300 are disposed in the positions of the image selection thumbnail areas 302 on the photo index sheet 300 as shown in FIG. 3, thus organizing the images on the sheet 300. On this occasion, the image layout may be made otherwise than the dispositions shown in FIG. 3.

Next, in step 602, a header area for the photo index sheet 300 is given. In this case, the header indicates a title, etc. of the photo index sheet 300 shown in FIG. 3. Subsequently, in step 603, a format for the print setting is given. The format indicates the mark sheet area 301, etc. shown in FIG. 3. In this area, the user sets the print resolution of the photo print, the paper size and other various categories of print data.

Next, in step 604, the re-output mark 304 of the photo index sheet 300 is given. The mark 304 is, as explained in FIG. 3, the mark for re-outputting the sheet 300 by filling the mark 304 and then by the sheet 300 reading operation of the image processing apparatus 100, if the user has miswritten the sheet, and so forth.

Subsequently in step 605, the sheet code 305 is given.

This (sheet code) is information embedded with the image information of the images shown in the photo index sheet 300. The sheet code 305 is, for instance, the information indicating start and end image numbers of an image range being embedded with the images printed on the sheet 300. The (image number) described above is the same as the image number assigned in step 502.

There is, as described above, actualized a scheme of organizing the images when the images designated by the user are recorded on the photo index sheet 300. In the case of forming the photo index sheet 300, however, there is no necessity of adopting the aforementioned image organizing method if the image marks and the re-output mark are attached to the photo index sheet 300.

Figure 7:
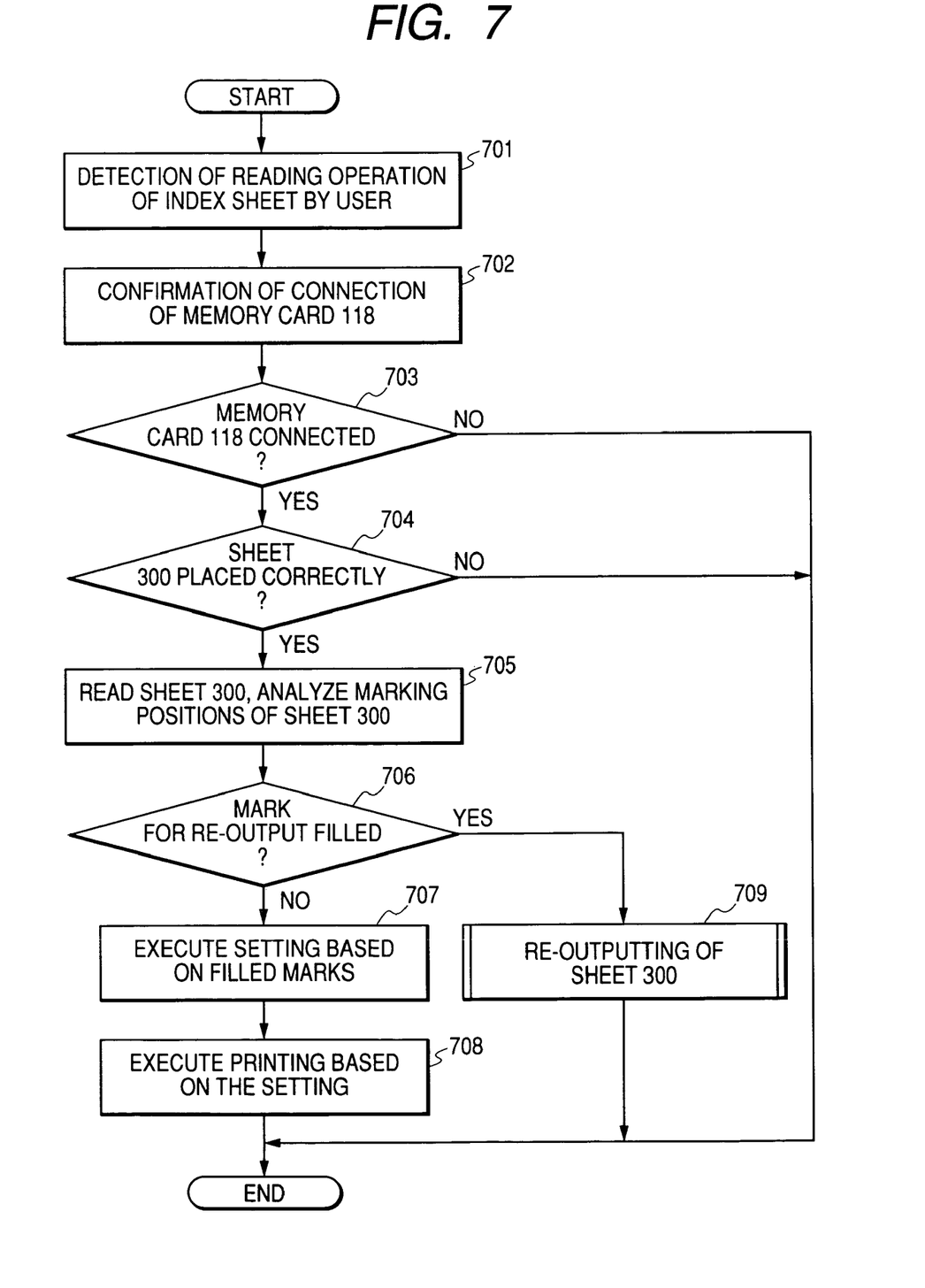
FIG. 7 is a flowchart showing an operation of printing a photo by scanning the photo index sheet 300 in the embodiment.

FIG. 7 is a flowchart showing an operation of printing the photo by scanning the photo index sheet 300.

At first, the image processing apparatus 100 can print the photo index sheet 300 by the method shown in FIG. 4. The user effects marking (fills the mark) on the want-to-photo-print image on the photo index sheet 300. Then, the image processing apparatus 100 reads this photo index sheet 300, whereby the photo is printed as the user designates.

To begin with, in step 701, it is recognized that the user has given the instruction of reading the photo index sheet 300 through the operation display unit 108. Owing to this operation, it is possible to distinguish from an operation, e.g., a simple copy operation other than the instruction of reading the photo index sheet 300.

Next, in step 702, it is recognized that the memory card 118 is connected to the image processing apparatus 100. In step 703, the operation is judged based on a result of this recognition. If it is detected that the memory card 118 is connected thereto, the operation proceeds to step 704. If the memory card 118 is not recognized, an error message is displayed on the operation display unit 108, and the operation finishes.

In step 704, it is detected whether or not the photo index sheet 300 is properly placed on the reading unit 107. If the photo index sheet 300 is not properly placed on the reading unit 107, the information can not be read from the photo index sheet 300. Hence, a message saying that the photo index sheet 300 can not be read, is displayed on the operation display unit 108, and the operation comes to an end.

Further, in step 704, if the photo index sheet 300 is properly placed thereon, the operation advances to step 705. Herein, according to the present embodiment, the judgment as to whether or not the photo index sheet 300 is properly placed involves using the reading unit 107. However, the judgment as to whether or not the photo index sheet 300 is properly placed, may be made by means excluding the reading unit 107.

A position of the mark disposed in the mark sheet area 301 on the photo index sheet 300 placed on the reading unit 107, is analyzed in step 705. On the photo index sheet 300, the mark area in the mark sheet area 301 is predetermined, and it is therefore feasible to judge from the readout data whether the user fills the mark area or not. Therefore, data indicating which mark the user has filled are acquired based on the data read by the reading unit 107. After acquiring the mark filled by the user, it is judged in step 706 whether the re-output mark on the photo index sheet 300 gets filled or not.

If the user does not yet fill the re-output mark 304, the process in step 707 is executed. Further, if it is detected in step 706 that the re-output mark 304 gets filled, when re-outputting the readout photo index sheet 300, it is recognized in step 709 that the re-output mark 304 gets filled, and hence other pieces of information are unnecessary for re-outputting the sheet 300. Such being the case, all pieces of information (with their marks filled) entered by user in the areas other than the re-output mark 304, are invalidated. This will be elucidated in depth in FIG. 8.

On the other hand, in step 707, the data corresponding to the filled-items in the mark sheet area 301 on the photo index sheet 300 are obtained. Based on the thus-obtained information, the set values for the photographic image print are set, and it is also set which image is printed and how many images are printed, and so forth. Then, the photo is printed in step 708.

Note that in the case of reading the photo index sheet 300, other operation of printing the image of which the information has been read from the photo index sheet 300, may also be adopted.

Figure 8:
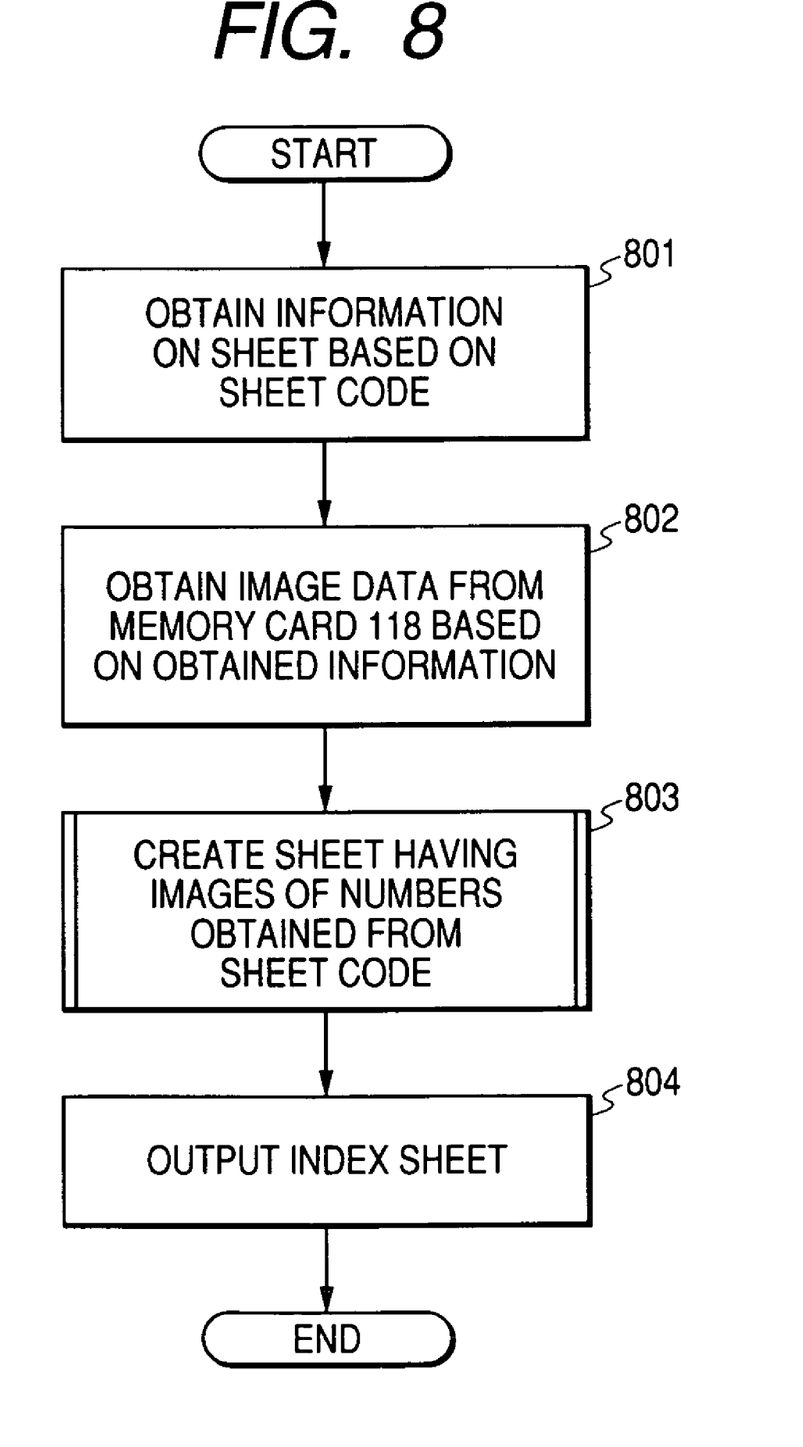
FIG. 8 is a flowchart showing an operation of re-outputting the photo index sheet 300 in the embodiment.

FIG. 8 is a flowchart showing an operation of re-outputting the photo index sheet 300 in the embodiment discussed above.

The operation shown in FIG. 8 is a specific operation of re-outputting the photo index sheet 300 in the case of re-outputting the sheet 300 based on the result of reading the photo index sheet 300 in FIG. 7.

At first, in step 801, the sheet information of the photo index sheet 300 is obtained from the photo index sheet 300. As explained above, the sheet code 305 is described on the sheet 300. The information indicating what image is printed on the readout sheet can be obtained from the sheet code 305 described thereon. Therefore, the user has no necessity of the user's designating which image exists on the sheet 300. Note that the image number for use is the same as the image number designated in step 502.

Next, in step 802, it is possible to recognize which image is printed on the sheet 300 on the basis of the image information obtained in step 801, and hence the image data to be printed on the sheet 300 are acquired from the memory card 118.

Subsequently, in step 803, the sheet data of the image numbers acquired from the sheet code 305 are created. This creating operation has already been explained in FIG. 6. The image data obtained in step 802 are printed on the photo index sheet 300 by this method.

The operation being done as described above, when re-outputting the sheet 300 miswritten by the user, the sheet 300 can be re-outputted simply by filling the re-output mark 304 on the sheet 300 and reading the sheet with the image processing apparatus 100. On the occasion of re-outputting the sheet, the image information can be acquired based on the sheet code 305 embedded in the sheet 300, and hence it is unnecessary for the user to make the complicated image selection, etc. as in step 404 shown in FIG. 4.

Namely, according to the embodiment discussed above, the operation for the image data, which has hitherto been required, becomes unnecessary, so that there is provided the method effective to the user. Note that the sheet code 305 defines the range of the image numbers corresponding to the images described on the sheet 300 in the embodiment described above. Information elements other than the sheet code 305 may be available on the premise that these information elements are information specifying the images described on the sheet 300.

In the embodiment discussed above, the aforementioned method are exemplified by way of the image information obtaining method and the re-outputting method, however, the embodiment described above may be applied to elements other than the sheet 300 on the premise that the same contents as those of the sheet 300 are outputted from these elements.

According to the embodiment discussed above, in the case of desiring to get one more index sheet because of miswriting, etc. on the index sheet 300, the desired sheet 300 can be re-printed simply by marking in the predetermined position on the sheet 300 and reading this sheet 300 without any complicated operation, and the user can easily acquire the sheet 300.

Further, according to the prior art, if there are a great number of images within the memory card 118, the sheet 300 becomes plural. For instance, if the description of only one sheet is mistaken, the correct sheets can not be obtained unless the plurality of sheets 300 are re-printed in the prior art. According to the embodiment discussed above, however, only the mistaken sheet can be printed, and hence there is no necessity of taking both of a labor for printing and the cost. Moreover, if the predetermined mark on the sheet 300 is not read, the images can be printed based on other mark on the sheet 300.

This application claims priority from Japanese Patent Application No. 2003-330948 filed Sep. 24, 2003, which is hereby incorporated by reference herein.

What is claimed is:

1. An image processing apparatus comprising:
   first printing means for creating first sheet data indicating a first sheet, and for printing the first sheet based on the first sheet data, wherein the first sheet includes (1) images based on image data obtained from an image storage medium and (2) a sheet code which encodes information identifying the images and information indicating entry spaces that a user can fill in;
   reading means for reading the first sheet printed by the first printing means, wherein the reading means reads the first sheet together with the sheet code and any modifications made to the first sheet by a user;
   retrieving means for retrieving image data from the image storage medium, wherein the retrieved image data is the same as the image data for the images included in the first sheet, and wherein the retrieved image data is retrieved based on the sheet code read by the reading means, when it is judged from the reading by the reading means that a predetermined entry space on the first sheet has been filled; and
   second printing means for creating second sheet data which is the same as the first sheet data based on the retrieved image data, when it is judged that the predetermined entry space on the first sheet has been filled, and for printing a second sheet based on the second sheet data.

2. An image processing apparatus according to claim 1, further comprising third printing means for printing one or more images corresponding to image data obtained from said image storage medium on the basis of one or more entry spaces on the first sheet, when it is judged that the predetermined entry space on the first sheet has not been filled in.

3. A sheet creating method comprising:
   a first printing step of creating first sheet data indicating a first sheet, and for printing the first sheet based on the first sheet data, wherein the first sheet includes (1) images based on image data obtained from an image storage medium and (2) a sheet code which encodes information identifying the images and information indicating entry spaces that a user can fill in;
   a reading step of reading the first sheet printed in the first printing step, wherein the reading step reads the first sheet together with the sheet code and any modifications made to the first sheet by a user;

a retrieving step for retrieving image data from the image storage medium, wherein the retrieved image data is the same as the image data for the images included in the first sheet, and wherein the retrieved image data is retrieved based on the sheet code read by the reading step, when it is judged from the reading by the reading step that a predetermined entry space on the first sheet has been filled; and a second printing step of creating second sheet data which is the same as the first sheet data based on the retrieved image data, when it is judged that the predetermined entry space on the first sheet has been filled, and of printing a second sheet based on the second sheet data.

4. A sheet creating method according to claim 3, further comprising third printing step of printing one or more images corresponding to image data obtained from said image storage medium on the basis of one or more entry spaces on the first sheet, when it is judged that the predetermined entry space on the first sheet has not been filled in.

* * * * *